(12) United States Patent
Do et al.

(10) Patent No.: US 10,195,588 B1
(45) Date of Patent: Feb. 5, 2019

(54) PROCESS FOR MAKING AND USING IRON AND MOLYBDENUM CATALYST FOR SLURRY HYDROCRACKING

(71) Applicant: UOP LLC, Des Plaines, IL (US)

(72) Inventors: Phuong T. M. Do, Mount Prospect, IL (US); Alakananda Bhattacharyya, Glen Ellyn, IL (US); Lance A. Baird, Prospect Heights, IL (US); Fred G. Sollberger, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/824,937

(22) Filed: Nov. 28, 2017

(51) Int. Cl.
| | | |
|---|---|---|
| C10G 47/12 | (2006.01) | |
| C10G 47/26 | (2006.01) | |
| B01J 23/28 | (2006.01) | |
| B01J 23/881 | (2006.01) | |
| B01J 27/051 | (2006.01) | |
| B01J 37/08 | (2006.01) | |
| B01J 37/20 | (2006.01) | |

(52) U.S. Cl.
CPC ............ *B01J 23/28* (2013.01); *B01J 23/881* (2013.01); *B01J 27/0515* (2013.01); *B01J 37/08* (2013.01); *B01J 37/20* (2013.01); *C10G 47/12* (2013.01); *C10G 47/26* (2013.01); *C10G 2300/1044* (2013.01)

(58) Field of Classification Search
None
See application file for complete search history.

(56) References Cited

U.S. PATENT DOCUMENTS

| | | | |
|---|---|---|---|
| 4,676,886 A | 6/1987 | Rahbe et al. | |
| 4,969,988 A | 11/1990 | Jain et al. | |
| 5,053,376 A | 10/1991 | Bearden, Jr. et al. | |
| 5,171,727 A | 12/1992 | Gatsis | |
| 5,620,591 A | 4/1997 | Poole et al. | |
| 5,755,955 A | 5/1998 | Benham et al. | |
| 8,123,933 B2 | 2/2012 | Bhattacharyya et al. | |
| 8,608,945 B2 * | 12/2013 | Bhattacharyya ....... | C10G 47/26 208/106 |
| 8,617,386 B2 * | 12/2013 | Bhattacharyya ....... | C10G 47/12 208/106 |
| 8,691,080 B2 | 4/2014 | Haizmann | |

(Continued)

FOREIGN PATENT DOCUMENTS

WO 2017058766 A1 4/2017

OTHER PUBLICATIONS

Kum, "Hydrotreatment of Heavy Crudes and Residuals", Third International Conference on Heavy Crude and Tar Sands.; Long Beach, CA, USA; Jul. 22-31, 1985.

(Continued)

*Primary Examiner* — Philip Y Louie
(74) *Attorney, Agent, or Firm* — James C. Paschall

(57) ABSTRACT

A process and catalyst is disclosed for converting a heavy hydrocarbon feed stream into lighter hydrocarbon products using a two component catalyst. The catalyst comprises iron and molybdenum containing catalyst. Alumina may be a third catalyst component. The molybdenum is present in the heavy hydrocarbon feed stream at about 500 wppm or less and the weight ratio of iron to the molybdenum is less than 5. Much lower concentrations of expensive molybdenum can be used due to the addition of iron in the catalyst.

12 Claims, 1 Drawing Sheet

(56) References Cited

U.S. PATENT DOCUMENTS

2011/0303584 A1    12/2011    Bhattacharyya et al.
2017/0050177 A1*    2/2017    Greeley ................... B01J 37/18

OTHER PUBLICATIONS

Meng, "Cyclosiloxane-based liquid-crystalline elastomers containing fluorinated mesogens and chiral crosslinking groups", Colloid Polym Sci (2014) 292:1511-1519.

Yue, "Acid-Modified Natural Bauxite Mineral as a Cost-Effective and High-Efficient Catalyst Support for Slurry-Phase Hydrocracking of High-Temperature Coal Tar", Energy and Fuels, vol. 30, Issue 11, Nov. 17, 2016, pp. 9203-9209.

* cited by examiner

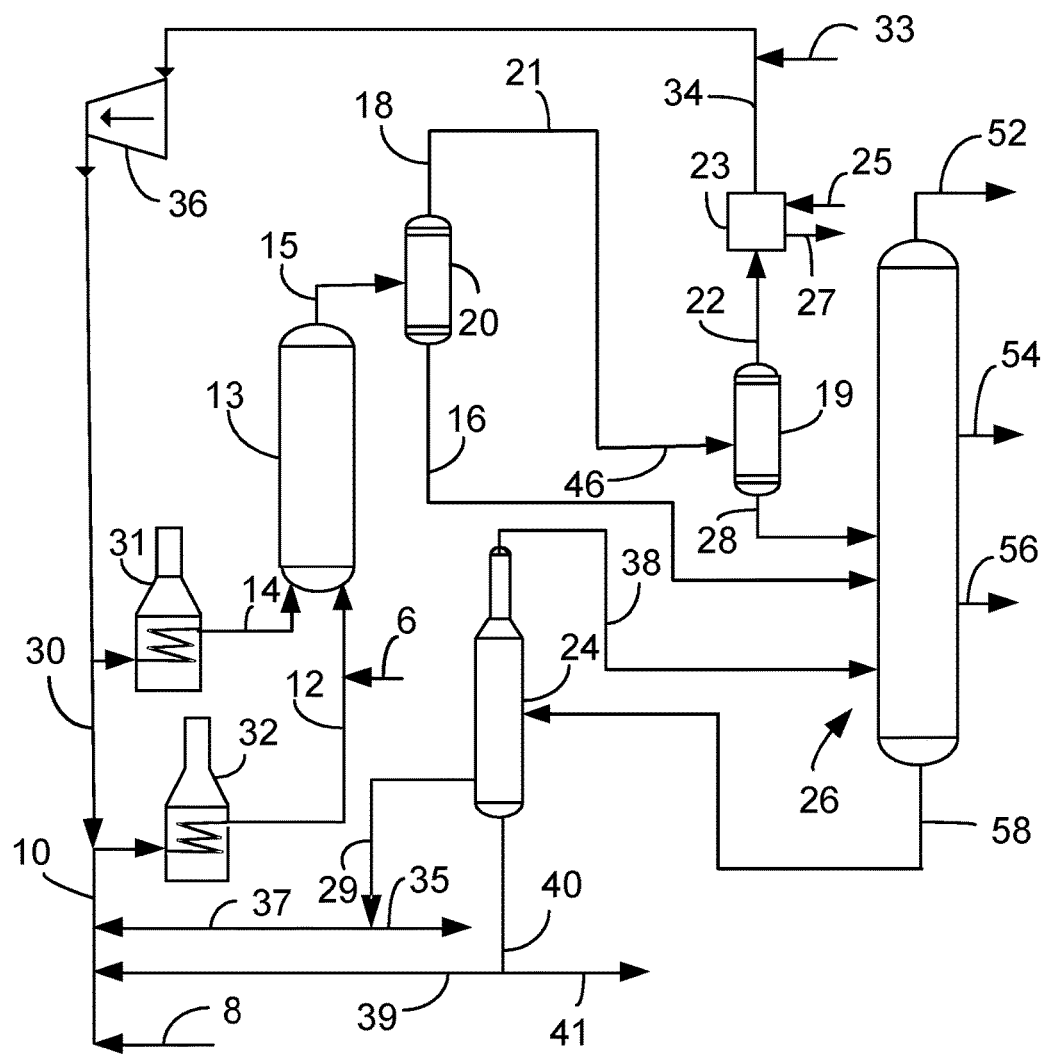

PROCESS FOR MAKING AND USING IRON AND MOLYBDENUM CATALYST FOR SLURRY HYDROCRACKING

BACKGROUND

This invention relates to a process and apparatus for the treatment of crude oils and, more particularly, to the hydrocracking of heavy hydrocarbons in the presence of catalyst to provide useable products and further prepare feedstock for further refining.

As the reserves of conventional crude oils decline, heavy oils must be upgraded to meet world demands. In heavy oil upgrading, heavier materials are converted to lighter fractions and most of the sulfur, nitrogen and metals must be removed. Heavy oils contain a large portion of material boiling above 524° C. (975° F.) or higher. These heavy hydrocarbon feed stocks may be characterized by low reactivity in visbreaking, high coking tendency, poor susceptibility to hydrocracking and difficulties in distillation. Most residual oil feed stocks which are to be upgraded contain some level of asphaltenes which are typically understood to be heptane insoluble and toluene soluble compounds as determined by ASTM D3279 or ASTM D6560. Asphaltenes are high molecular weight compounds which may contain heteroatoms which impart polarity.

Heavy oil must be upgraded in a primary upgrading unit before it can be further processed into useable products. Primary upgrading units known in the art include, but are not restricted to, coking processes, such as delayed or fluidized coking, and hydrogen addition processes such as ebullated bed or slurry hydrocracking (SHC). U.S. Pat. No. 5,755,955 describes a SHC process which has been found to provide high liquid yields with much reduced coke formation through the use of catalyst.

In SHC, a three-phase mixture of heavy hydrocarbon feed cracks in the presence of gaseous hydrogen over solid catalyst to produce lighter products under pressure at an elevated temperature. Iron sulfate has been disclosed as an SHC catalyst, for example, in U.S. Pat. No. 5,755,955. Iron sulfate monohydrate (ISM) is expensive and may not be sufficiently available to catalyze all of the SHC units the world may need to upgrade vast supplies of heavy oil. Other minerals such as bauxite have been shown to be an excellent SHC catalyst for example in U.S. Pat. No. 8,123,933 B2.

U.S. Pat. No. 5,171,727 describes a method for preparing a catalyst which involves introducing a metal and a heteropolyacid into an oil feed. The feed is then heated to form an organometallic compound, which is then converted to a catalyst under hydrocracking conditions. The metal is described as an oxide, sulfide, or salt of a Group IV to Group VIII metal. The heteropolyacid can be phosphomolybdic acid in an amount, expressed as molybdenum, of 0.01 wt % to 2 wt %.

Molybdenum catalyst systems of either oil-soluble molybdenum or a solid molybdenum on carbon matrix, known as carbonized molybdenum, are effective for SHC. However, the cost for molybdenum catalysts are high and strongly dependent on the market price volatility.

Toluene can be used as a solvent to dissolve and separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in an SHC reactor and that coke formation is likely to occur under prevailing conditions.

Due to the anticipated demand for SHC operations to upgrade heavy oil, greater supplies of effective catalyst will become necessarily desirable.

SUMMARY

We have found that combining an iron component with a molybdenum component to provide a catalyst with a weight ratio of iron to molybdenum that is less than 5 provides improved slurry hydrocracking activity with less molybdenum concentration in the heavy hydrocarbon feed stream, such as about 500 wppm or less. In an aspect, iron and alumina particles comprise the preferred iron component. The alumina may be considered a third component in the catalyst. A molybdenum catalyst precursor may be mixed with sulfur in a hydrocarbon material to provide a catalyst precursor concentrate which can be heated to an elevated temperature to provide a catalyst concentrate of the molybdenum component before or after addition of the iron component. The catalyst concentrate can be mixed with the heavy hydrocarbon feed stream to the SHC reactor.

BRIEF DESCRIPTION OF THE DRAWING

For a better understanding, reference is made to the accompanying drawing.

The FIGURE is a schematic flow scheme for an SHC process.

Definitions

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns omit a reboiler at a bottom of the column and instead provide heating requirements and separation impetus from a fluidized inert media such as steam. Stripping columns typically feed a top tray and take main product from the bottom.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above about 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 vol % or 95 vol %, as the case may be, respectively, of the sample boils using ASTM D-7169, ASTM D-86 or TBP, as the case may be.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, "pitch conversion" means the conversion of materials boiling above 524° C. (975° F.) converting to material boiling at or below 524° C. (975° F.).

As used herein, "vacuum gas oil" means the hydrocarbon material boiling in the range between about 343° C. (650° F.) and about 524° C. (975° F.) AEBP as determined by any standard gas chromatographic simulated distillation method such as ASTM D2887, D6352 or D7169, all of which are used by the petroleum industry.

As used herein, "atmospheric residuum" means the hydrocarbon material boiling with an IBP of at least about 232° C. (450° F.), a T5 of between about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

As used herein, "vacuum residuum" means the hydrocarbon material boiling with an IBP of at least 500° C. (932° F.).

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

The term "$C_x$" are to be understood to refer to molecules having the number of carbon atoms represented by the subscript "x". Similarly, the term "$C_{x-}$" refers to molecules that contain less than or equal to x and preferably x and less carbon atoms. The term "$C_{x+}$" refers to molecules with more than or equal to x and preferably x and more carbon atoms.

DETAILED DESCRIPTION

We have found that a small amount of iron added to a molybdenum containing catalyst can reduce the concentration of molybdenum required to catalyze a SHC reaction to sufficient conversion and selectivity to desirable products while suppressing formation of TIOR and mesophase. The molybdenum may be incorporated with a hydrocarbon to comprise solid molybdenum or carbonized molybdenum or may be oil soluble. We have also found that alumina present with the iron such as in an iron alumina mineral particle, particularly reduces the concentration of molybdenum required for SHC catalysis because the alumina provides adsorption sites for mesophase and adsorbs vanadium and nickel which can poison the active molybdenum. The alumina may be considered a third component of the catalyst. The small concentration of iron enables the iron to be processed with the molybdenum containing catalyst and passed to the reactor by a pump.

The process of this invention is capable of processing a wide range of heavy hydrocarbon feedstocks. It can process aromatic feedstocks, as well as feedstocks which have traditionally been very difficult to hydroprocess; e.g., atmospheric or vacuum residuum, visbroken residue, deasphalted bottom materials, off-specification asphalt, sediment from the bottom of oil storage tanks, tar sands, bitumen, etc. Preferred feeds include atmospheric residuum and preferably, vacuum residuum. Suitable feeds include an API gravity of no more than 20 degrees, typically no more than 10 degrees and may include feeds with less than 5 degrees.

In the exemplary SHC process as shown in the FIGURE, one, two or all of a heavy hydrocarbon feed stream in line 8, a recycle pitch stream containing catalyst in line 39, and recycled heavy VGO (HVGO) in line 37 may be combined in line 10. The combined feed in line 10 is heated in the heater 32 and pumped through an inlet line 12 into an inlet in the bottom of the tubular SHC reactor 13. Catalyst may be added directly to heavy hydrocarbon oil feed in the SHC reactor 13 from a catalyst line 6 with the heavy hydrocarbon feed stream in line 12 before entering the reactor 13 to form a slurry in the reactor 13. The catalyst in catalyst line 6 may be a catalyst concentrate stream. A portion of the heavy hydrocarbon feed stream in line 8 may provide a heavy hydrocarbon that is used to make the catalyst concentrate in the catalyst line 6. Many mixing and pumping arrangements may be suitable. It is also contemplated that more than one heavy hydrocarbon feed stream may be added separately to the SHC reactor 13. Additional recycled hydrogen and make-up hydrogen from line 30 are fed into the SHC reactor 13 through line 14 after undergoing heating in heater 31. The hydrogen in line 14 that is not premixed with feed may be added at a location above the feed entry in line 12. Both heavy hydrocarbon feed stream from line 12 and hydrogen in line 14 may be distributed in the SHC reactor 13 with an appropriate distributor. Additionally, hydrogen may be added to the heavy hydrocarbon feed stream in line 10 before it is heated in the heater 32 and delivered to the SHC reactor in line 12. Preferably, the recycled pitch stream in line 39 makes up in the range of about 5 to 15 wt % of the feedstock to the SHC reactor 13, while the HVGO in line 37 makes up in the range of 5 to 50 wt % of the feedstock, depending upon the quality of the feedstock and the once-through conversion level. The feed entering the SHC reactor 13 comprises three phases, solid catalyst particles and solid hydrocarbon feed, liquid hydrocarbon feed and gaseous hydrogen and vaporized hydrocarbon feed.

The process can be operated at quite moderate pressure, in the range of 3.5 MPa (g) (500 psig) to 24 MPa (g) (3500 psig) and preferably in the range of 10.3 MPa (g) (1500 psig) to 17.2 MPa (g) (2500 psig), without coke formation in the SHC reactor 13 with the appropriate catalyst. The reactor temperature is typically in the range of about 400 to about 500° C. with a temperature of about 440 to about 465° C. being suitable and a range of 445 to 460° C. being preferred. The LHSV is typically below about 4 $hr^{-1}$ on a fresh feed basis, with a range of about 0.1 to 3 $hr^{-1}$ being preferred and a range of about 0.3 to 1 $hr^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor 13 is above the inlet. Although only one is shown in the FIGURE, one or more SHC reactors 13 may be utilized in parallel or in series with interstage separation of converted product. Because the feed is converted to vaporous product, foaming tends to occur in the SHC reactor 13. An antifoaming agent may also be added to the SHC reactor 13, preferably to the top thereof, to reduce the tendency to generate foam. Suitable antifoaming agents include silicones as disclosed in U.S. Pat. No. 4,969,988.

A gas-liquid mixture is withdrawn from the top of the SHC reactor 13 through line 15 and separated preferably in a hot, high-pressure separator 20 kept at a separation temperature between about 200° C. (392° F.) and 470° C. (878° F.) and preferably at about the pressure of the SHC reactor. In the hot separator 20, the effluent from the SHC reactor 13 is separated into a gaseous stream 18 and a liquid stream 16. The liquid stream 16 contains HVGO. The gaseous stream 18 comprises between about 35 and 80 vol % of the hydrocarbon product from the SHC reactor 13 and is further processed to recover hydrocarbons and hydrogen for recycle.

A liquid portion of the product from the hot separator 20 may be further separated at lower temperature and/or stripped to provide a hot slurry hydrocracked liquid effluent in line 16 to the product fractionation column 26.

The gaseous stream in line 18 may be passed to a cold high pressure separator 19. Within the cool separator 19, the product is separated into a gaseous stream rich in hydrogen which is drawn off through the overhead in line 22 and a liquid hydrocarbon product which is drawn off the bottom through line 28. The hydrogen-rich stream 22 may be passed through a packed scrubbing tower 23 where it is scrubbed by means of a scrubbing liquid in line 25 to remove hydrogen sulfide and ammonia. The spent scrubbing liquid in line 27 may be regenerated and recycled and is usually an amine. The scrubbed hydrogen-rich stream emerges from the scrubber via line 34 and is combined with fresh make-up hydrogen added through line 33 and recycled through a recycle gas compressor 36 and line 30 back to reactor 13. The bottoms line 28 may carry cold liquid slurry hydrocracked product to a further low pressure flash drum and/or a stripper before feeding a cold slurry hydrocracked liquid effluent stream to the product fractionation column 26.

The product fractionation column 26 may comprise one or several vessels although it is shown only as one in the FIGURE. The product fractionation column 26 produces a $C_4$-recovered in overhead line 52, a naphtha product stream in line 54, a diesel stream in line 56 and a VGO/pitch stream in bottoms line 58.

The bottoms line 58 may carry the VGO/pitch stream to a vacuum fractionation column 24 maintained at a pressure between about 1.7 kPa (a) (0.25 psia) and 10.0 kPa (a) (1.5 psia) and at a vacuum distillation temperature resulting in an atmospheric equivalent cut point between light VGO and HVGO of between about 250° C. (482° F.) and about 500° C. (932° F.). Three fractions may be separated in the liquid vacuum fractionation column: an overhead fraction of light VGO in an overhead line 38 which may be further processed or recycled through line 38 back to the product fractionation column 26, a HVGO stream from a side cut in line 29 and a pitch stream obtained in a bottoms line 40 which typically boils above 450° C. At least a portion of this pitch stream may be recycled back in line 39 to form part of the feed slurry to the SHC reactor 13. Remaining catalyst particles from SHC reactor 13 may be present in the pitch stream and may be conveniently recycled back to the SHC reactor 13. Any remaining portion of the pitch stream is recovered in line 41.

During the SHC reaction, it is important to minimize coking. Adding a lower polarity aromatic oil to the feedstock reduces coke production. The polar aromatic material may come from a portion of the HVGO in line 29 recycled by line 37 to form part of the feed slurry to the SHC reactor 13. The remaining portion of the HVGO may be recovered in line 35.

The catalyst comprises two components: iron and molybdenum. The molybdenum may be incorporated with a hydrocarbon. The iron may be provided in iron particles. Alumina may also be part of the catalyst and may comprise a third component of the catalyst. The iron and alumina may be part of the same particles and comprise the iron component and perhaps, the alumina component. The iron particles may be provided from iron sulfate such as in hydrate form as iron sulfur monohydrate, iron sulfur heptahydrate and iron salts, etc. Iron and alumina particles may be provided from bauxite, red mud which is alumina depleted bauxite, limonite, and laterite. Iron in the catalyst is initially present in the oxide form before it is sulfided to the active form.

The iron particles may comprise between about 10, preferably between about 20, and about 90 wt % iron oxide and between about 10 and about 90 wt %, preferably no more than about 80 wt %, alumina. Iron-containing bauxite is a preferred bulk available mineral having these proportions. Bauxite typically has about 10 to about 40 wt % iron oxide, $Fe_2O_3$, and about 54 to about 84 wt % alumina and may have about 10 to about 35 wt % iron oxide and about 55 to about 80 wt % alumina. Bauxite also may comprise silica, $SiO_2$, and titania, $TiO_2$, in aggregate amounts of usually no more than 10 wt % and typically in aggregate amounts of no more than 6 wt %. Iron is present in bauxite as iron oxide and aluminum is present in bauxite as alumina.

Red mud which comprises bauxite with much of the alumina extracted will have a larger proportion of iron and a lower proportion of alumina such as about 3 to about 30 wt % alumina and preferably about 25 to about 90 wt % iron oxide and preferably between about 35 and about 60 wt % iron oxide. Calcium oxide may be present in red mud in about 1 to about 40 wt % and preferably between about 1 to about 10 wt %. Volatiles such as water and carbon dioxide are also present in bulk available minerals, but the foregoing weight proportions exclude the volatiles. Iron oxide is also present in bauxite in a hydrated form, $Fe_2O_3 \cdot nH_2O$. Again, the foregoing proportions exclude the water in the hydrated composition. A preferred red mud has a small proportion of micropores that have diameters smaller than 75 angstroms such as under 10% and preferably under 5%.

Alumina may be present in the iron particles in several forms including alpha, gamma, chi, kappa, delta, eta, theta, boehmite, pseudo-boehmite, gibbsite, diaspore, bayerite, nordstrandite and corundum. Alumina can be provided in the catalyst by derivatives such as spinels and perovskites. Suitable iron particles can be provided as bauxite available from Saint-Gobain Norpro in Stow, Ohio who may provide it air dried and ground, but these treatments may not be necessary for suitable performance as an iron component of the catalyst.

The iron component may be subjected to a thermal treatment or a sulfide treatment before contacting the heavy hydrocarbon feed stream. However, water does not impede formation of active iron sulfide from iron oxide in bauxite, so removing water by the thermal or any other drying treatment is not required before the iron component enters the reactor. The water on the iron particle can be either chemically bound to the iron oxide, alumina or other parts of the iron particle or be physically bound to the iron particle. The iron in iron oxide in the presence of alumina such as in bauxite quickly converts to active iron sulfide without the need for presenting an excess of a sulfiding agent to the catalyst in the presence of a heavy hydrocarbon feed stream and hydrogen at high temperature as required for other slurry hydrocracking catalysts before addition to the reaction zone.

The activated iron sulfide in the iron particle has several molecular forms, so is generally represented by the formula, $Fe_xS$, where x is between 0.7 and 1.3. We have found that essentially all of the iron oxide in bauxite converts to iron sulfide upon heating the mixture of hydrocarbon and catalyst to 410° C. in the presence of hydrogen and a sulfiding agent such as sulfur or hydrogen sulfide. In this context, "essentially all" means no peak for iron oxide is generated on an XRD plot of intensity vs. two theta degrees at 33.1 two theta degrees or no less than 99 wt % conversion to iron sulfide. The sulfiding agent may be present in the hydrocarbon feed as organic sulfur compounds. Consequently, the iron in the particle may be added to the heavy hydrocarbon feed in the +3 oxidation state, preferably as $Fe_2O_3$.

Iron particles may also comprise iron sulfate monohydrate or heptahydrate. Hydrated iron sulfate is typically ground down to smaller size for better dispersion and facilitation of mass transfer. Particle size may be less than 45 microns and with at least 50 wt % having particle diameter less than 10 microns. Iron sulfate, $FeSO_4$, usually requires careful thermal treatment in air to remove water from iron sulfate which is typically provided in a hydrated form. Other iron containing catalysts such as limonite may be used but may require presulfiding treatment for conversion of the iron oxide to the active iron sulfide. The active iron in the iron sulfide catalyst is required to obtain adequate conversion and selectivity to useful liquids and to avoid higher coke formation.

The iron in the catalyst may be no more than about 1.0 wt % in the heavy hydrocarbon feed stream to the SHC reactor. The iron in the catalyst may be no more than about 0.7 wt % in the hydrocarbon feed to the SHC reactor. The iron in the catalyst may be no more than about 0.6 wt % in the hydrocarbon feed to the SHC reactor. The iron in the catalyst may be no more than about 0.5 wt % in the hydrocarbon feed to the SHC reactor. The iron in the catalyst may be no lower than about 0.3 wt % in the hydrocarbon feed to the SHC reactor. The iron in the catalyst may be no lower than about 0.4 wt % in the hydrocarbon feed to the SHC reactor.

The alumina in the catalyst may comprise no more than about 2.4 wt % of the hydrocarbon feed. The alumina in the catalyst may comprise no more than about 0.9 wt % of the hydrocarbon feed. The alumina in the catalyst may comprise no more than about 0.6 wt % of the hydrocarbon feed. The alumina in the catalyst may comprise no more than about 0.5 wt % of the hydrocarbon feed. The alumina in the catalyst may comprise no more than about 0.4 wt % of the hydrocarbon feed. The alumina in the catalyst may comprise no more than about 0.3 wt % of the hydrocarbon feed. The alumina in the catalyst may comprise no more than about 0.2 wt % of the hydrocarbon feed. The alumina in the catalyst may comprise no more than about 0.1 wt % of the hydrocarbon feed.

If bauxite particles are used as the iron component, bauxite may comprise no more than about 2.5 wt % of the hydrocarbon feed. The bauxite particles may comprise no more than about 1.0 wt % of the hydrocarbon feed. The bauxite particles may comprise no more than about 0.6 wt % of the hydrocarbon feed. The bauxite particles may comprise no more than about 0.5 wt % of the hydrocarbon feed. The bauxite particles may comprise no more than about 0.4 wt % of the hydrocarbon feed. The bauxite particles may comprise no more than about 0.3 wt % of the hydrocarbon feed. The bauxite particles may comprise no more than about 0.2 wt % of the hydrocarbon feed. The bauxite particles may comprise no more than about 0.1 wt % of the hydrocarbon feed. In some cases, the bauxite particles may comprise at least about 0.05 wt % of the hydrocarbon feed.

We have found that a catalyst comprising an iron component in conjunction with a molybdenum component can be used to reduce the concentration of molybdenum used to achieve similar conversion and suppression of mesophase. The iron and molybdenum component catalyst can have an activity corresponding to a higher concentration of molybdenum by itself while using at least a portion of a lower cost iron catalyst, particularly iron and alumina particles such as bauxite.

The molybdenum component may be provided by carbonized molybdenum. A catalyst concentrate which may comprise the molybdenum component as carbonized molybdenum can be prepared by first mixing or otherwise introducing a molybdenum catalyst precursor into a heavy hydrocarbon material, such as a heavy hydrocarbon material that is or includes a higher boiling material having an IBP of at least about 232° C. (450° F.), such as a resid fraction of atmospheric or vacuum resid. The molybdenum catalyst precursor is a molybdenum compound that may be converted or processed into a molybdenum component of the catalyst. The catalyst concentrate or the catalyst precursor concentrate is the catalyst or catalyst precursor, respectively, concentrated in a heavy hydrocarbon material which may be mixed with a heavy hydrocarbon feed stream to the SHC reactor 13. It is important that the heavy hydrocarbon material comprise asphaltenes and/or resins. Preferably, at least 10 wt % of the heavy hydrocarbon material is a higher boiling material. Most preferably, the heavy hydrocarbon material also comprises a lighter boiling material having an IBP lower than about 232° C. (450° F.). In an aspect, the heavy hydrocarbon material may comprise a blend of higher and lower boiling material of at least about 22 wt % higher boiling material. Preferred concentrations of the heavy hydrocarbon material in the blend include from about 22 to 85 wt %, more preferably from about 30 to 85 wt %, still more preferably about 40 to 85 wt % and, most preferably about 45 to 75 wt %, based on the total weight of the blend. The light oil may be a gas oil such as HVGO. The heavy hydrocarbon material may be a heavy hydrocarbon feed stream to a slurry hydrocracking reactor or a portion thereof. The heavy hydrocarbon material may be a portion of the heavy hydrocarbon feed stream that is diverted to make a catalyst concentrate which is then remixed with the heavy hydrocarbon feed stream. Catalyst line 6 in the FIGURE may represent a catalyst concentrate stream.

A molybdenum catalyst precursor solution may be mixed with the heavy hydrocarbon material which may or may not contain a sulfiding agent. The molybdenum catalyst precursor may be water soluble. It is preferred that the molybdenum catalyst precursor be a polyacid of molybdenum. Preferred polyacids are those selected from the group consisting of heteropoly acids, such as the polyacids of molybdenum, preferably phosphomolybdic acid and molybdosilicic acid. Most preferred is phosphomolybdic acid. The term "phosphomolybdic acid" is used herein to designate aqueous solutions of the reaction product of $MoO_3$ with dilute phosphoric acid in which the phosphorus to molybdenum atomic ratio ranges from about 0.083 to about 2, preferably from about 0.083 to about 1 and most preferably from about 0.083 to about 0.5. A molybdenum catalyst precursor solution can contain one or more phosphomolybdic acid species such as the 12-molybdophosphoric acid and the dimeric 18-molybdophosphoric acid. Moreover, the crystalline 12 and 18 acids can be used to prepare the water solutions of phosphomolybdic acid used herein. If such crystalline phosphomolybdic acids are used, additional $H_3PO_4$ or other phosphorus compounds may be added to the solution to provide the desired phosphorous-to-molybdenum ratio. A sufficient amount of the aqueous phosphomolybdic acid solution is mixed with the heavy hydrocarbon material to provide from about 0.2 to about 2 wt %, preferably from about 0.2 to about 1 wt %, more preferably about 0.3 to about 1 wt % molybdenum from the phosphomolybdic acid, calculated as elemental molybdenum based on the hydrocarbon material. The resulting mixture is a water-containing molybdenum catalyst precursor concentrate; i.e., a wet molybdenum catalyst precursor concentrate. High shear mixing is an example of a suitable method for mixing an aqueous solution of the molybdenum catalyst precursor in the heavy hydrocarbon material. Due to the difference in boiling point between water and the heavy hydrocarbon material, the water from the solution can be removed during a drying step at a convenient drying temperature, such as between about 100 and about 150° C. for about 0.5 to about 1.5 hours.

The molybdenum component may be provided in a molybdenum catalyst precursor concentrate which may include molybdenum in a non-sulfided form. The molybdenum catalyst precursor can be mixed in the heavy hydrocarbon material, such as by high shear mixing to provide the molybdenum catalyst precursor concentrate. One option can be to perform a sulfidation process after mixing the molybdenum catalyst precursor and the iron component in the heavy hydrocarbon material. In other embodiments, the molybdenum catalyst precursor can be pre-sulfided typically in the heavy hydrocarbon material before mixing in the iron component in the molybdenum catalyst precursor concentrate. After presulfiding the molybdenum catalyst precursor concentrate, the iron component can be introduced into the heavy hydrocarbon material. Sulfidation of the iron component may occur upon activation of the molybdenum catalyst precursor before entering the slurry hydrocracking reactor or when exposed to hydrogen sulfide generated in the slurry hydrocracking reactor. Varied sequences for formation of the sulfided catalyst can allow a reduced or minimized concentration of molybdenum with a larger concentration of the iron component. In some aspects, the catalytic activity of the iron component can be greater than the catalytic activity of the molybdenum component.

After mixing the molybdenum catalyst precursor and perhaps the iron component in the heavy hydrocarbon material, the molybdenum catalyst precursor can be sulfided with a sulfiding agent. A sulfiding agent may be introduced into the heavy hydrocarbon material to sulfide the molybdenum catalyst precursor. Preferred sulfiding agents include hydrogen sulfide, a blend of hydrogen sulfide and hydrogen and elemental sulfur with or without hydrogen. Suitable organic sulfiding agents include dimethyl disulfide, dimethyl sulfide, tertiary butyl polysulfide and thioacetamide.

For example, the heavy hydrocarbon material containing the molybdenum catalyst precursor may be exposed to a treat gas stream containing both hydrogen and hydrogen sulfide. The amount of hydrogen sulfide in the treat gas stream can range from about 0.5 mole % to about 10 mole %, or at least to about 2 mole %. The temperature for sulfidation can be similar to the temperature for slurry hydrocracking the heavy hydrocarbon feed stream, such as about 350° C. to about 480° C., or about 400° C. to about 480° C. The hydrogen partial pressure during sulfidation can also be similar to the pressure during slurry hydrocracking, and therefore can range from about 1.7 MPa (g) (250 psig) to 23.4 MPa (g) (3400 psig). The time of sulfidation can be any convenient amount of time and can typically be dependent on the conditions selected during sulfidation. Examples of sulfidation times can range from about 0.01 hours to about 150 hours, depending on the severity of the conditions and the time the catalyst is resident within the slurry hydrocracking reactor.

The most preferred sulfiding agent is elemental sulfur. The elemental sulfur, is preferably either a sublimed powder or a concentrated dispersion of sublimed powder, such as commercialized flowers of sulfur, in heavy hydrocarbon material. Allotropic forms of elemental sulfur, such as orthorhombic and monoclinic sulfur are also suitable for use herein. The preferred physical form of sulfur is the sublimed powder, although sulfur may also be introduced as molten sulfur and as sulfur vapor. The amount of sulfur mixed with the heavy hydrocarbon material is such that the atomic ratio of sulfur to molybdenum is from about 1/1 to about 8/1, preferably from about 2/1 to about 7/1 and, more preferably from about 3/1 to about 6/1. In an aspect, sulfur may be added to the heavy hydrocarbon material before the molybdenum catalyst precursor is added to it. Alternatively, sulfur can be added at any point in the preparation of catalyst concentrate as long as it is not contacted with an aqueous solution prior to being introduced into the hydrocarbon. For example, sulfur can be added to the hydrocarbon material after the molybdenum catalyst precursor in the catalyst concentrate has been dried. If the elemental sulfur is added to the heavy hydrocarbon material, the amount of sulfur in the catalyst concentrate should still meet the aforementioned requirements pertaining to atomic ratio of sulfur to metal: the atomic ratio of sulfur to molybdenum will remain about 1/1 to about 8/1.

To activate or form the molybdenum catalyst component, the dried molybdenum catalyst precursor in the catalyst concentrate is heated, in the substantial absence of added hydrogen, with or without the iron component to an elevated temperature of at least about 275° C., preferably at an elevated temperature ranging from about 275° C. to about 425° C., more preferably from about 315° C. to about 410°

C. and, most preferably from 330° C. to about 400° C. The total pressure in the heating step will range from about 0 kPa (g) (0 psig) to about 3500 kPa (g) (500 psig), preferably from about 0 kPa (g) (0 psig) to about 690 kPa (g) (100 psig). The molybdenum catalyst precursor in the catalyst concentrate is heated for an effective amount of time to convert the molybdenum catalyst precursor to the corresponding molybdenum catalyst component. Under these conditions, the molybdenum catalyst precursor is converted in the presence of sulfur and heavy hydrocarbon material to a solid molybdenum catalyst component comprising a molybdenum in a hydrocarbon matrix or carbonized molybdenum.

The iron component can be added to the molybdenum component in the catalyst concentrate at any time in the process. In one embodiment, the iron component may be added to the molybdenum component in the catalyst concentrate after the molybdenum component in the catalyst concentrate has been pre-sulfided and/or pre-activated. In another embodiment, the iron component may be added to the heavy hydrocarbon material before or after the molybdenum solution is added to the heavy hydrocarbon material after which they can be together sulfided and activated. In a further embodiment, the iron component may be added to the heavy hydrocarbon material after the molybdenum catalyst precursor is added to the heavy hydrocarbon material and pre-sulfided but before the molybdenum catalyst precursor is activated in the catalyst concentrate.

In various aspects, the concentration of molybdenum on a molybdenum basis in the heavy hydrocarbon feed stream to be slurry hydrocracked can be about 500 wppm or less, about 400 wppm or less, about 300 wppm or less, about 250 wppm or less, about 230 wppm or less, about 220 wppm or less, or about 200 wppm or less, or about 175 wppm or less, or about 150 wppm or less, and/or at least 10 wppm, or at least 25 wppm, or at least 50 wppm, or at least about 75 wppm, or at least 100 wppm. The heavy hydrocarbon material containing a resid fraction can be the same as or different from the to-be-slurry hydrocracked heavy hydrocarbon feed stream into which the catalyst concentrate is mixed.

The high catalytic activity of the iron component can be achieved based on a catalyst or a corresponding catalyst concentrate having a low weight ratio of iron to molybdenum. In various aspects, the weight ratio of iron to molybdenum in the catalyst, the catalyst concentrate or the heavy hydrocarbon feed stream is less than 5, less than about 4, less than about 3, less than about 2.5, less than about 2.3, less than about 2, or less than about 1.5 and/or at least about 0.25, at least about 0.5 or at least about 0.6. Using a relatively low concentration of the iron component or particles comprising the iron component and the alumina component enables the iron component to be transported in the catalyst concentrate along with the molybdenum component, while not requiring special or additional pumping equipment.

After forming a sulfided molybdenum catalyst concentrate including the iron component, the catalyst concentrate can be added to the heavy hydrocarbon feed stream which is reacted under slurry hydrocracking conditions. The reaction conditions for slurry hydrocracking can be selected, so that the pitch conversion of the heavy hydrocarbon feed stream across all slurry hydrocracking reactors, if there is more than one arranged in series, is at least about 80%, such as at least about 85%, at least about 90%, or at least about 95%, optionally up to about 99%, or up to about 95%, or up to about 90%. The portion of the heavy hydrocarbon feed stream that is unconverted after slurry hydrocracking can be referred to as pitch from slurry hydrocracking.

The two-component catalyst can maintain TIOR in the product as a percentage of feed at no more than about 5 wt %, suitably no more than about 4 wt % and preferably no more than 2.5 wt %. The two-component catalyst can achieve this performance while pushing pitch conversion above 85% and maintaining mesophase yield as a percentage of toluene insolubles below 5 wt % and preferably below 3 wt %.

Example

An Urals vacuum resid having a characterization in Table 1 was used to test the catalyst.

TABLE 1

| | |
|---|---|
| Density, g/cm$^3$ | 1.02 |
| Sulfur, wt % | 3.1 |
| Carbon, wt % | 85.75 |
| Hydrogen, wt % | 10.55 |
| Nitrogen, wt % | 0.65 |
| Heptane Insolubles, wt % | 21.8 |
| Carbon Residue, wt % | 8.55 |
| Pentane Insolubles, wt % | 13.25 |
| Toluene Insolubles, wt % | <0.01 |

Two component catalysts were prepared by mixing molybdenum catalyst concentrate with an iron component comprising bauxite in the proportions of molybdenum and ground bauxite from St. Gobain shown in Table 2. Catalysts A, B and D contained pre-activated molybdenum catalyst in a heavy hydrocarbon material. Ground St. Gobain bauxite was added to concentrates of Catalysts A and B after activation. Catalyst C was activated after ground St. Gobain bauxite was added to the catalyst concentrate as indicated below. Catalyst D contained no bauxite. The ground bauxite comprised 22.9 wt % iron oxide and 35.8 wt % alumina.

Catalyst A, B and D were prepared as follows. About 200 to 400 grams of dispersant oil which may comprise Urals vacuum resid was blended with 1 to 5 grams of elemental sulfur powder at about 80 to about 100° C. for at least 10 minutes. Ten to 100 grams of phosphomolybdic acid comprising 5-10 wt % molybdenum was quickly added to the sulfide dispersant oil and blended for at least 10 minutes. Blending took place under a nitrogen blanket. The mixture of phosphomolybdic acid, sulfur and dispersant oil was heated in a beaker under a nitrogen blanket to evaporate off the water until the temperature of the mixture reached 121° C. after which heat was terminated while mixing continued until cooled. The mixture was then activated in an autoclave at 332 to 360° C., blanketed with nitrogen or hydrogen at 97 kPa (g) (14 psig) to 690 kPa (g) (100 psig) for 20 minutes while stirring.

Catalyst C was prepared as follows. Molybdenum trioxide and phosphoric acid were reacted to make phosphomolybdic acid containing 6.2 wt % molybdenum. A heavy hydrocarbon material comprised 200 grams of Urals vacuum resid and 200 grams of straight-run VGO blended together at 80 to 100° C. Sufficient elemental sulfur was added to the heavy hydrocarbon material under high shear mixing under atmospheric nitrogen for 10 minutes at 80° C. to achieve a sulfur to molybdenum molar ratio of 3:1. To the heavy hydrocarbon material was added 32.2 grams of the phosphomolybdic acid after which was added 50 grams of dried bauxite under stirring for 30 minutes. The mixture of phosphomolybdic acid, bauxite and heavy hydrocarbon material was heated to 100° C. for 1 hour under atmospheric nitrogen to evaporate off the water until the temperature of the mixture reached 120° C. after which heat was terminated while mixing continued for another 30 minutes. The mixture was then activated in an autoclave at 350° C. under nitrogen blanket at 690 kPa (g) (100 psig) for 30 minutes while stirring.

Catalyst testing was conducted to examine activity of the catalysts for slurry hydrocracking the Urals vacuum resid in a batch autoclave at 450° C., 13.8 MPa (g) (2000 psig) hydrogen for 120 minutes. Five hundred grams of Urals vacuum residues and each of the catalyst concentrates A-D were separately charged to the autoclave reactor and mixing was started at 300 rpm. Hydrogen was brought online to the reactor. Mixer speed was then increased to 1000 rpm, the band heater temperature set point was raised to 450° C., and the reactor pressure was brought to the operating pressure. Flow was commenced at 6.5 sl/min. of hydrogen. The experiment was considered to have begun once liquid temperature reached 450° C. The experiment was held at temperature and pressure with mixing for 120 minutes. The experiment was terminated by turning off all heaters, reducing mixing rate to 300 rpm, and bringing cooling water online into the reactor jacket. The plant was cooled from 450° C. to 100° C. in 15 minutes and then was de-pressured. The plant was then re-pressured to 1.4 MPa (gauge) (200 psig) with nitrogen and the knock-out pots were emptied with the aid of the plant pressure. Plant was again de-pressured and reactor contents were unloaded.

Reactor material was diluted with toluene and filtered through 7-10 μm paper in a Buchner funnel. The filtered solid was washed until the filtrate was transparent, but not colorless. The filtrates were combined and concentrated under vacuum on a rotary evaporator at 45° C. until nearly solvent free. The temperature was then raised to 75° C. for 1 hour after which the material was weighed and sent for analytical testing. The liquid product material was then weighed and sent for analytical testing. The knock-out pot material was isolated from any entrained water and both weights were recorded. The knock-out pot organic component was then sent for analytical testing.

The toluene-insoluble (TI) solids remaining on the filter paper were then dried in the vacuum oven at 100° C. for 24 hours prior to Soxhlet extraction at 110° C. for 6 hours in toluene solvent to remove additional toluene-soluble organic material. The Soxhlet extracted TI solids were dried in the vacuum oven at 100° C. for 24 hours and then subjected to mesophase analysis via polarized light microscopy. Table 2 indicates the results of catalyst testing.

TABLE 2

| Catalyst | Description | Bauxite, wt % | Molybdenum, wppm | Pitch conversion, % | TIOR % | Mesophase in TI, wt % |
|---|---|---|---|---|---|---|
| A | Activated molybdenum catalyst mixed with bauxite | 0.30 | 228 | 85.1 | 2.0 | 4.3 |
| B | Activated molybdenum catalyst mixed with bauxite | 0.50 | 225 | 86.3 | 2.3 | 4.1 |
| C | Molybdenum catalyst mixed with bauxite and activated together | 0.57 | 225 | 85.6 | 1.9 | 2.6 |
| D | Activated molybdenum catalyst with no bauxite | 0 | 305 | 85.3 | 2.4 | 4.6 |

The two component catalysts performed comparably or better than the single molybdenum catalyst with a higher concentration of molybdenum in terms of pitch conversion and better in terms of lower TIOR and mesophase as a percentage of TIOR. The two-component catalyst C in which both catalyst components were together during activation had the second highest pitch conversion, but the best performance in terms of lower TIOR and mesophase.

SPECIFIC EMBODIMENTS

While the following is described in conjunction with specific embodiments, it will be understood that this description is intended to illustrate and not limit the scope of the preceding description and the appended claims.

A first embodiment of the invention is a process for converting heavy hydrocarbon feed stream into lighter hydrocarbon products comprising mixing the heavy hydrocarbon feed stream with catalyst and hydrogen to provide a heavy hydrocarbon slurry, the catalyst comprising an iron component and a molybdenum component; wherein the molybdenum is present in the hydrocarbon feed stream at about 500 wppm or less and the weight ratio of iron to the molybdenum is less than 5; and hydrocracking hydrocarbons in the heavy hydrocarbon slurry in the presence of hydrogen and the catalyst to produce a hydrocracked slurry product comprising lighter hydrocarbon products. An embodiment of the invention is one, any or all of prior embodiments in this paragraph up through the first embodiment in this paragraph wherein the iron component is provided as bauxite, red mud, iron sulfate, limonite, laterite or iron salt particles. An embodiment of the invention is one, any or all of prior embodiments in this paragraph up through the first embodiment in this paragraph wherein the iron is provided with alumina in the iron component. An embodiment of the invention is one, any or all of prior embodiments in this paragraph up through the first embodiment in this paragraph wherein the iron in the iron component is no more than about 1.0 wt % in the hydrocarbon feed. An embodiment of the invention is one, any or all of prior embodiments in this paragraph up through the first embodiment in this paragraph wherein the iron component is provided as bauxite particles which comprise no more than 2.5 wt % of the hydrocarbon feed. An embodiment of the invention is one, any or all of prior embodiments in this paragraph up through the first embodiment in this paragraph wherein the iron component is provided as particles that are mixed with the molybdenum component. An embodiment of the invention is one, any or all of prior embodiments in this paragraph up through the first embodiment in this paragraph further comprising mixing a molybdenum compound with a hydrocarbon material and a sulfiding agent to provide a catalyst precursor concentrate, heating the catalyst precursor concentrate to an elevated temperature to produce a catalyst concentrate, and adding particles comprising the iron component to the hydrocarbon material. An embodiment of the invention is one, any or all of prior embodiments in this paragraph up through the first embodiment in this paragraph further comprising adding particles comprising the iron component to the hydrocarbon material before heating the catalyst precursor concentrate to an elevated temperature. An embodiment of the invention is one, any or all of prior embodiments in this paragraph up through the first embodiment in this paragraph further comprising mixing the catalyst concentrate with the heavy hydrocarbon feed stream.

A second embodiment of the invention is a method for forming a slurry catalyst, comprising mixing a molybdenum catalyst precursor with a sulfiding agent in a hydrocarbon material to provide a catalyst precursor concentrate, heating the catalyst precursor concentrate to an elevated temperature to form a catalyst concentrate; and adding iron particles to the catalyst precursor concentrate or to the catalyst concentrate to achieve a weight ratio of iron to molybdenum in the catalyst precursor concentrate of less than 5. An embodiment of the invention is one, any or all of prior embodiments in this paragraph up through the second embodiment in this paragraph, further comprising mixing the catalyst concentrate with a heavy hydrocarbon feed stream to achieve a concentration of molybdenum in the heavy hydrocarbon feed stream of about 500 wppm or less and slurry hydrocracking the heavy hydrocarbon feed stream. An embodiment of the invention is one, any or all of prior embodiments in this paragraph up through the second embodiment in this paragraph, wherein the molybdenum catalyst precursor comprises phosphomolybdic acid and/or a different molybdenum heteropolyacid. An embodiment of the invention is one, any or all of prior embodiments in this paragraph up through the second embodiment in this paragraph, wherein the iron particles comprises alumina. An embodiment of the invention is one, any or all of prior embodiments in this paragraph up through the second embodiment in this paragraph, wherein mixing a molybdenum catalyst precursor in the hydrocarbon material comprises mixing an aqueous solution of molybdenum in the hydrocarbon material to provide the catalyst precursor concentrate and drying the catalyst precursor concentrate by heating the catalyst precursor concentrate to about 150° C. or less to remove at least a portion of water present in the catalyst precursor concentrate prior to heating the catalyst precursor concentrate to an elevated temperature. An embodiment of the invention is one, any or all of prior embodiments in this paragraph up through the second embodiment in this paragraph, wherein the iron particles in the catalyst concentrate is no more than about 1.0 wt % of the heavy hydrocarbon feed stream. An embodiment of the invention is one, any or all of prior embodiments in this paragraph up through the second embodiment in this paragraph, wherein a concentration of molybdenum in the heavy hydrocarbon feed stream being about 250 wppm or less. An embodiment of the invention is one, any or all of prior embodiments in this paragraph up through the second embodiment in this paragraph wherein the iron particles include about 20 to about 90 wt % alumina.

A third embodiment of the invention is a process for converting heavy hydrocarbon feed stream into lighter hydrocarbon products comprising mixing the heavy hydrocarbon feed stream with catalyst and hydrogen to provide a heavy hydrocarbon slurry, the catalyst comprising iron and alumina particles mixed with molybdenum; wherein the molybdenum is present in the hydrocarbon feed stream at about 250 wppm or less and the weight ratio of iron to the molybdenum is less than 5; and hydrocracking hydrocarbons in the heavy hydrocarbon slurry in the presence of hydrogen and the catalyst to produce a slurry hydrocracked product comprising lighter hydrocarbon products. An embodiment of the invention is one, any or all of prior embodiments in this paragraph up through the third embodiment in this paragraph wherein the iron is provided on bauxite particles which comprise no more than 2.5 wt % of the hydrocarbon feed. An embodiment of the invention is one, any or all of prior embodiments in this paragraph up through the third embodiment in this paragraph wherein the iron in the catalyst is no more than about 1.0 wt % in the heavy hydrocarbon feed stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting a heavy hydrocarbon feed stream into lighter hydrocarbon products comprising:
   mixing said heavy hydrocarbon feed stream with catalyst and hydrogen to provide a heavy hydrocarbon slurry, said catalyst comprising an iron component and a solid molybdenum component; wherein said solid molybdenum component comprises molybdenum in a hydrocarbon matrix and said molybdenum is present in the hydrocarbon feed stream at about 500 wppm or less and the weight ratio of iron to the molybdenum is less than 5; and
   hydrocracking hydrocarbons in said heavy hydrocarbon slurry in the presence of hydrogen and said catalyst to produce a hydrocracked slurry product comprising lighter hydrocarbon products.

2. The process of claim 1 wherein the iron component is provided as bauxite, red mud, iron sulfate, limonite, laterite or iron salt particles.

3. The process of claim 1 wherein the iron is provided with alumina in the iron component.

4. The process of claim 1 wherein the iron in the iron component is no more than about 1.0 wt % in the hydrocarbon feed.

5. The process of claim 1 wherein the iron component is provided as bauxite particles which comprise no more than 2.5 wt % of the hydrocarbon feed.

6. The process of claim 1 wherein the iron component is provided as particles that are mixed with the molybdenum component.

7. The process of claim 6 further comprising mixing a molybdenum compound with a hydrocarbon material and a sulfiding agent to provide a catalyst precursor concentrate comprising the molybdenum component, heating the catalyst precursor concentrate to an elevated temperature to produce a catalyst concentrate, and adding particles comprising the iron component to the hydrocarbon material.

8. The process of claim 7 further comprising adding particles comprising the iron component to the hydrocarbon material before heating the catalyst precursor concentrate to an elevated temperature.

9. The process of claim 8 further comprising mixing said catalyst concentrate with said heavy hydrocarbon feed stream.

10. A process for converting a heavy hydrocarbon feed stream into lighter hydrocarbon products comprising:
   mixing said heavy hydrocarbon feed stream with catalyst and hydrogen to provide a heavy hydrocarbon slurry, said catalyst comprising iron and alumina particles mixed with molybdenum; wherein said molybdenum is prepared by mixing said molybdenum with a heavy hydrocarbon material and heating the mixture to an elevated temperature to provide molybdenum in a hydrocarbon matrix and said molybdenum is present in the hydrocarbon feed stream at about 250 wppm or less and the weight ratio of iron to the molybdenum is less than 5 after mixing said heavy hydrocarbon feed stream with said catalyst; and
   hydrocracking hydrocarbons in said heavy hydrocarbon slurry in the presence of hydrogen and said catalyst to produce a slurry hydrocracked product comprising lighter hydrocarbon products.

11. The process of claim 10 wherein the iron is provided on bauxite particles which comprise no more than 2.5 wt % of the hydrocarbon feed.

12. The process of claim 10 wherein the iron in the catalyst is no more than about 1.0 wt % in the heavy hydrocarbon feed stream.

* * * * *